United States Patent
Boutin

(10) Patent No.: US 7,886,487 B2
(45) Date of Patent: Feb. 15, 2011

(54) WEATHERSTRIP HAVING HYBRID CARRIER

(75) Inventor: Roger Adrien Boutin, Ridgeway (CA)

(73) Assignee: Henniges Automotive Sealing Systems North America, Inc., Farmington Hills, MI (US)

( * ) Notice: Subject to any disclaimer, the term of this patent is extended or adjusted under 35 U.S.C. 154(b) by 0 days.

(21) Appl. No.: 10/748,047

(22) Filed: Dec. 30, 2003

(65) Prior Publication Data
US 2005/0144849 A1    Jul. 7, 2005

(51) Int. Cl.
*E06B 7/16* (2006.01)

(52) U.S. Cl. ............... 49/490.1; 49/475.1; 428/122; 428/595

(58) Field of Classification Search .......... 49/490.1, 49/475.1, 498.1; 52/716.8, 717.01, 716.5; 428/122, 136, 138, 140, 573, 595, 596, 600
See application file for complete search history.

(56) References Cited

U.S. PATENT DOCUMENTS

| | | | |
|---|---|---|---|
| 3,256,577 A * | 6/1966 | Bright | 24/563 |
| 4,046,940 A | 9/1977 | Prikkel, III | |
| 4,678,696 A | 7/1987 | Maeno et al. | |
| 4,702,039 A | 10/1987 | Bocchinfuso | |
| 5,199,142 A | 4/1993 | Davis | |
| 5,302,466 A | 4/1994 | Davis et al. | |
| 5,493,815 A | 2/1996 | Belser et al. | |
| 5,622,008 A | 4/1997 | King | |
| 5,752,345 A * | 5/1998 | Bright et al. | 49/490.1 |
| 5,783,312 A | 7/1998 | Laughman et al. | |
| 6,079,160 A * | 6/2000 | Bonds | 49/490.1 |
| 6,106,911 A | 8/2000 | Dupuy | |
| 6,128,859 A | 10/2000 | Vance | |
| 6,461,713 B2 * | 10/2002 | King | 428/108 |
| 6,684,574 B2 * | 2/2004 | Hayashi | 49/490.1 |
| 6,854,240 B2 * | 2/2005 | Mizuno et al. | 52/716.5 |

FOREIGN PATENT DOCUMENTS

| | | |
|---|---|---|
| DE | 10124484 | 11/2002 |
| EP | 0460792 | 12/1991 |
| GB | 2245018 A * | 12/1991 |

OTHER PUBLICATIONS

Supplementary European Search Report, EP 04796716, Apr. 16, 2010, 2 pages.

* cited by examiner

*Primary Examiner*—Jerry Redman
(74) *Attorney, Agent, or Firm*—Howard & Howard Attorneys PLLC

(57) ABSTRACT

A vehicle weatherstrip, beltstrip or door seal includes a hybrid carrier or core and extruded or molded elastomeric sealing features. The hybrid carrier includes lineal sections of diverse flexibility and compressibility which are achieved by upsetting the metal carrier by lancing, stamping or coining and, optimally, stretching. Preferably, the carrier is manufactured in a continuous length, the elastomeric material is extruded or molded thereover and the resulting product is cut into useable lengths having the desired more flexible and more rigid regions disposed along its length which correspond to corners and straight sections, respectively, of for example, a glass run.

19 Claims, 5 Drawing Sheets

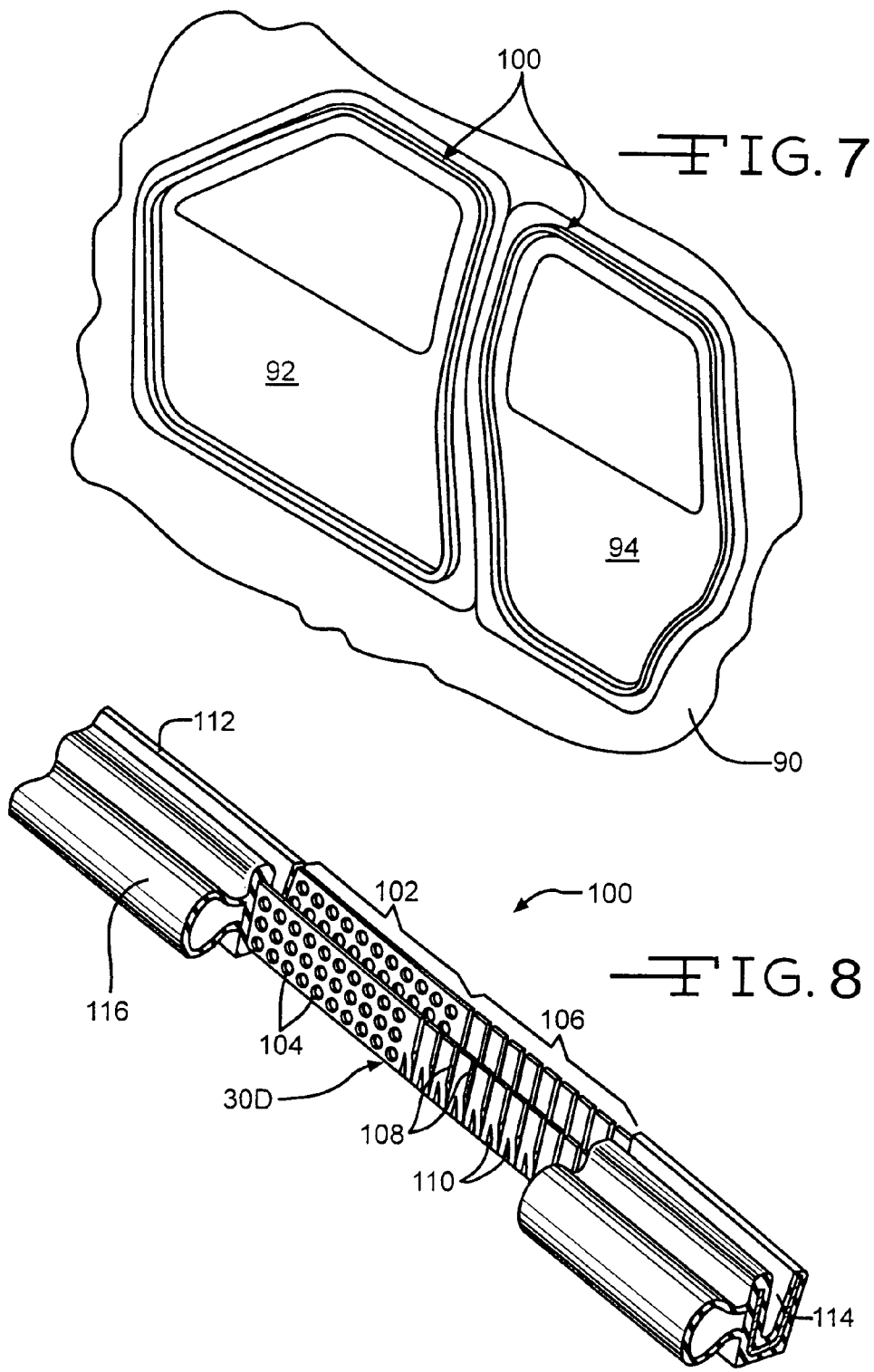

WEATHERSTRIP HAVING HYBRID CARRIER

BACKGROUND OF THE INVENTION

The invention relates generally to weatherstrips for motor vehicles and more particularly to weatherstrips, beltstrips and door seals for motor vehicles having a metal core or carrier exhibiting lineal regions of diverse rigidity and compressibility.

Weatherstrips and beltstrips have long been utilized by automobile manufacturers to seal between a fixed or movable glass light and the adjacent vehicle panel such as a door or door frame. Generally speaking, a weatherstrip refers to that portion of the seal extending vertically up one side of a window light, across the upper portion and down the opposite side. Typically as well, these weatherstrips extend well into the door to serve as tracks or rows for the window when it is lowered and retracted into the door. A beltstrip refers to that sealing component which extends across the lower portion of the window opening from one vertical edge of the opening to the other and seals and aesthetically finishes the region between the door and the window light. A door seal, as the name suggests, refers to the seal between a door and the vehicle body.

Particularly with regard to the weatherstrip, many competing engineering and aesthetic demands must be considered. Perhaps of greatest importance is the necessity to achieve an air and water tight seal around the glass and between the weatherstrip and the door frame such that both the ingress of water and the generation of wind noise are completely eliminated. Second of all, the weatherstrip must provide an aesthetically pleasing appearance to the door frame. Thirdly, it must conform to both the shape of the door frame and the glass and provide a suitable and uniform track in which the glass is received and translates.

One of the challenges of the last consideration is the desire to provide significant rigidity to the weatherstrip in regions where the weatherstrip it is substantially straight such as the front and back vertical runs as well as the upper horizontal run and also permit the bending or forming of the weatherstrip to conform to corners of the window and window frame and any other curves or non-linear portions of the window and frame dictated by aesthetics or mechanical considerations.

In the past, such weatherstrips have frequently been fabricated of an internal metal core and outer molded elastomeric material. To accommodate the straight and curved sections, the metallic core was assembled from a plurality of short sections having a desired flexibility or rigidity.

The present invention represents a significant improvement over such weatherstrips or beltstrips having cores assembled from a plurality of sections.

BRIEF SUMMARY OF THE INVENTION

A vehicle weatherstrip, beltstrip or door seal includes a hybrid carrier or core and extruded or molded elastomeric sealing features. The hybrid carrier includes lineal sections of diverse flexibility and compressibility which are achieved by upsetting the metal carrier by lancing, stamping or coining and, optimally, stretching. Preferably, the carrier is manufactured in a continuous length, the elastomeric material is extruded or molded thereover and the resulting product is cut into useable lengths having the desired more flexible and more rigid regions disposed along its length which correspond to corners and straight sections, respectively, of for example, a glass run.

Thus it is an object of the present invention to provide a motor vehicle weatherstrip, beltstrip or door seal having a carrier or core exhibiting diverse flexibilities.

It is a further object of the present invention to provide a motor vehicle weatherstrip, beltstrip or door seal having a carrier or core exhibiting diverse compressibilities.

It is a still further object of the present invention to provide a weatherstrip, beltstrip or door seal having a metal core or carrier with distinct regions of greater or lesser flexibility which is encapsulated by molding or extruding within elastomeric sealing material.

Further objects and advantages of the present invention will become apparent by reference to the following description of the preferred embodiment and appended drawings wherein like reference numbers refer to the same component, element or feature.

BRIEF DESCRIPTION OF THE DRAWINGS

FIG. 7 is a diagrammatic view of motor vehicle and doors with the present invention utilized as a motor vehicle door seal; and FIG. 8 is an enlarged perspective view of a motor vehicle door seal according to the present invention with a portion of the seal material removed.

DETAILED DESCRIPTION OF THE INVENTION

Figure 1:
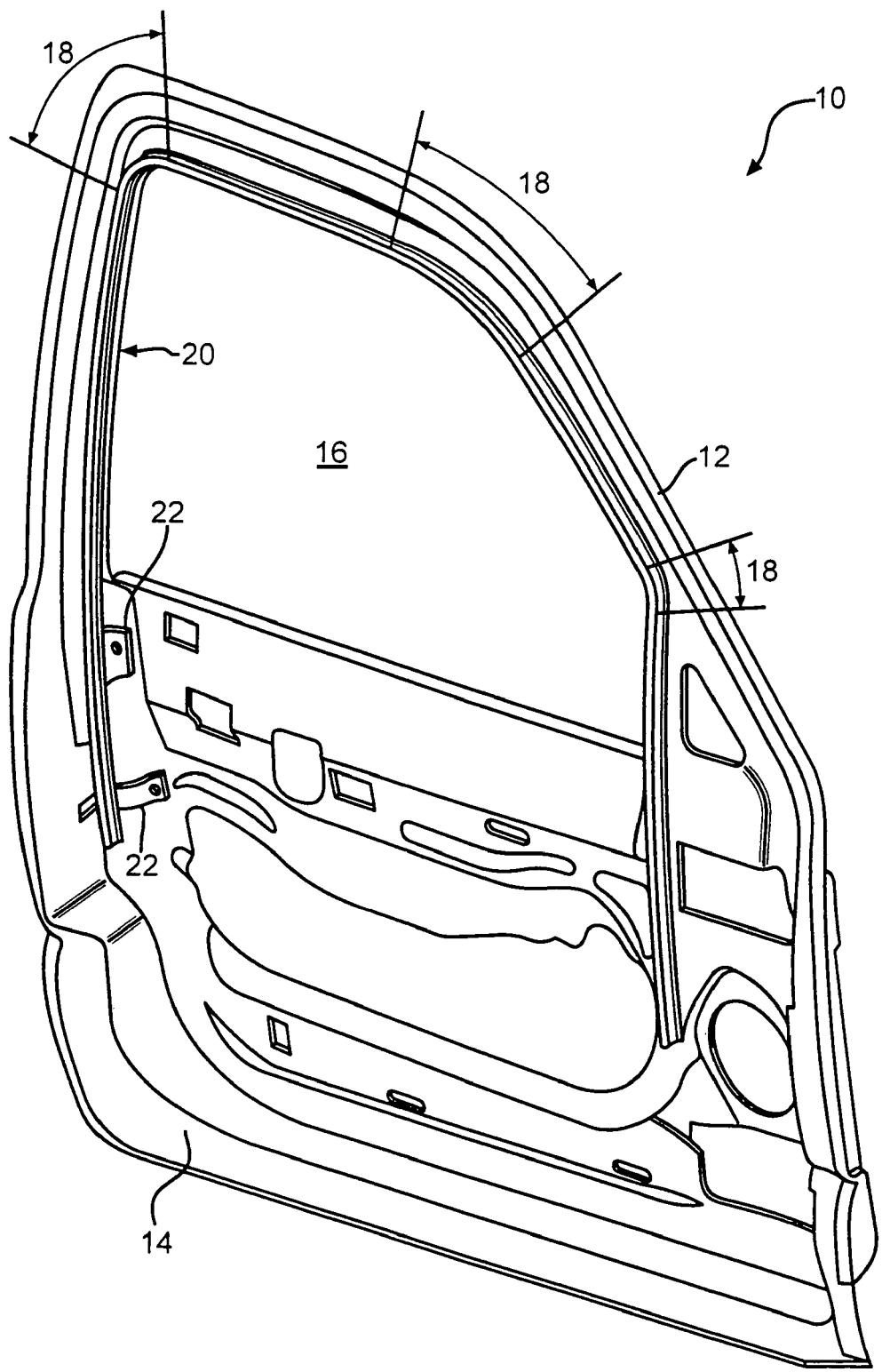
FIG. 1 is a perspective view of a typical motor vehicle door having a weatherstrip according to the present invention disposed thereon.
Figure 2:
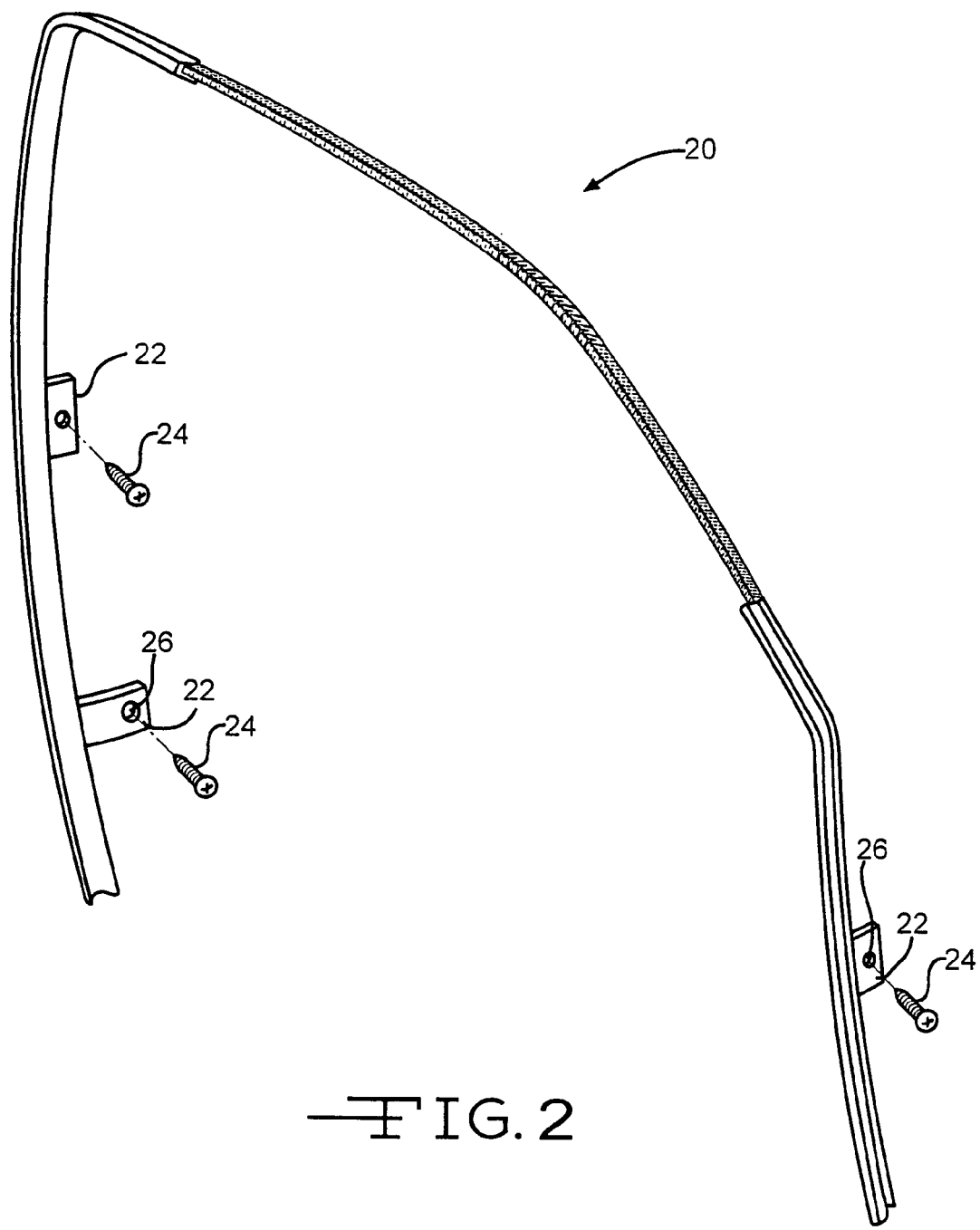
FIG. 2 is a perspective view of a motor vehicle weatherstrip according to the present invention with a portion of the seal material removed.

Referring now to FIGS. 1 and 2, a typical door for a motor vehicle such as a passenger car, sport utility vehicle (SUV), station wagon or pick-up truck is illustrated and designated by the reference number 10. The door 10 includes an upper freestanding frame portion 12 which extends from a lower panel section 14. The frame portion 12 and the lower panel section 14 cooperatively define a window opening 16 which receives a window or glass light (not illustrated). It will be appreciated that the frame portion 12 includes curved regions 18 of relatively small radii interconnecting straight or relatively straight regions. Extending about the interior of the window opening 16 and depending into and secured to the lower panel section 14 is a weatherstrip assembly 20. Preferably, the weatherstrip assembly 20 includes mounting clips or brackets 22. The mounting clips or brackets 22 may either be formed integrally with the weatherstrip assembly 20 or secured thereto mechanically or by a compatible adhesive. Threaded fasteners 24 which extend through suitably sized openings 26 in the mounting brackets or clips 22 secure the lower portions of the weatherstrip assembly 20 to the lower panel section 14.

Figure 3:
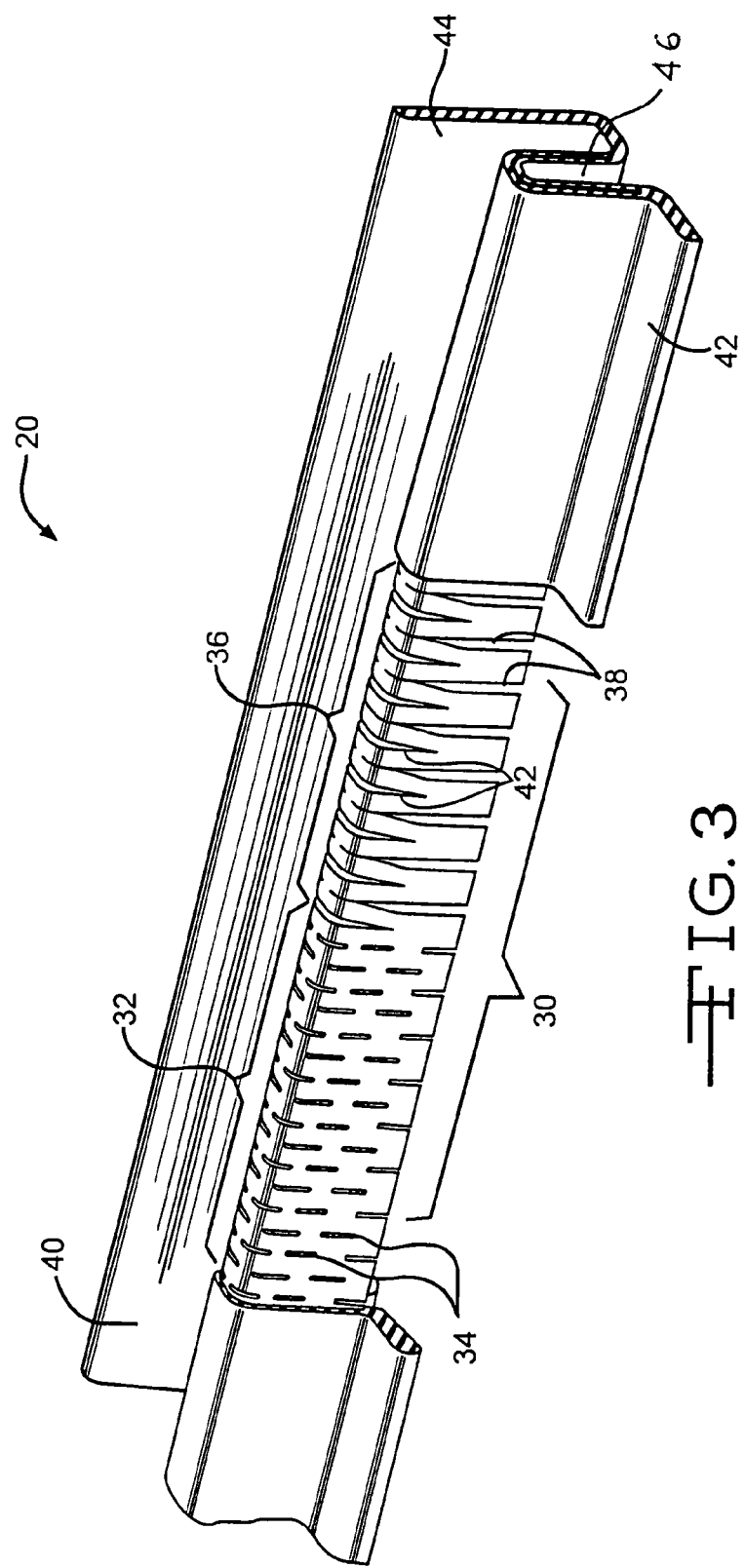
FIG. 3 is an enlarged perspective view of a motor vehicle weatherstrip according to the present invention with a portion of the seal material removed.
Figure 4:
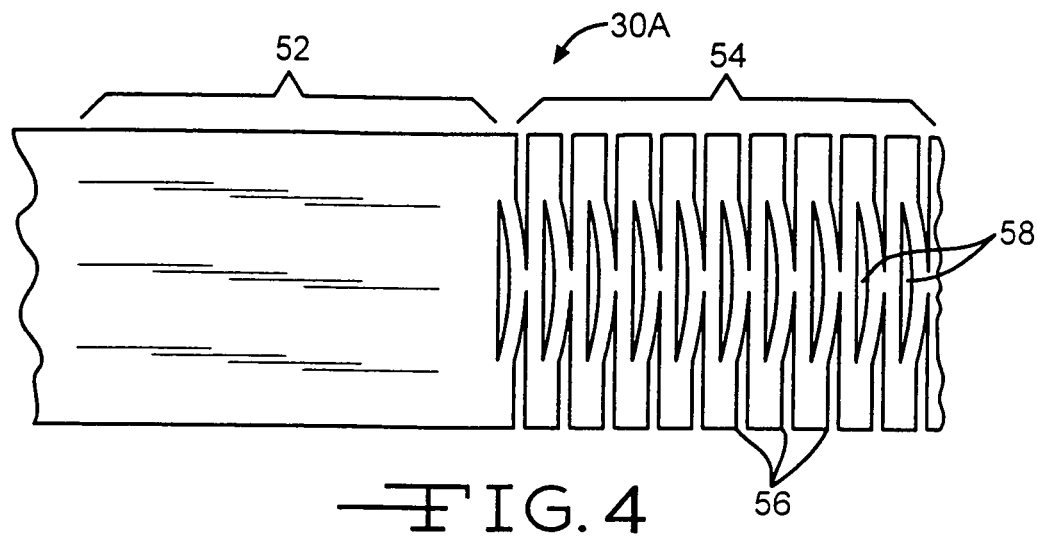
FIG. 4 is an enlarged, plan view of a first alternate embodiment carrier or core of a motor vehicle weatherstrip according to the invention.

Referring now to FIG. 3, the weatherstrip assembly 20 includes a metal core or carrier 30 having regions of diverse flexibility and compressibility. For example, the metal carrier 30 includes a first region 32 of lower flexibility, i.e., higher rigidity. Such region 32 may be achieved by no or little mechanical modification of the carrier or core 30. For example, as illustrated in FIG. 3, relatively small, alternating and discontinuous apertures or slots 34 may be formed in the carrier or core 30 to provide minimally reduced rigidity, i.e., enhanced flexibility, from its continuous, unaltered condition. Such apertures or slots 34 also assist in achieving intimate bonding between the carrier or core 30 and molded or extruded elastomeric material 40 which encapsulates the carrier or core 30. Alternatively, and as illustrated in FIG. 4, the carrier or core 30 may be undisturbed (solid) and thus generally exhibit maximum rigidity and minimum flexibility and compressibility. Preferably, the core or carrier 30 is fabricated of steel or aluminum. Other materials having similar strength and toughness such as certain plastics may also be utilized.

In an adjacent, more flexible region 36, a plurality of larger slits 38 which extend to the edges of the core or carrier 30 and central intermediate slots 42 which provide significantly greater flexibility, i.e., lower rigidity, and increased compressibility. It will be appreciated that the less flexible, i.e., more rigid, and less compressible regions 32 preferably correspond to the straight or substantially straight regions of the weatherstrip assembly 20 illustrated in FIG. 1 between the curved regions 18 which correspond to the regions 36 of greater flexibility, i.e., less rigidity, and more compressibility of the core or carrier 30. It will be appreciated that the slots 34 and the larger slits 38 and 42 illustrated in FIG. 3 are illustrative only and that numerous and various patterns and configurations of variously oriented slots, slits, polygonal openings, achieved by stamping, lancing, coining and stretching, which provide diverse linear regions of distinct flexibilities along the core or carrier 30 are all deemed to be within the purview of this invention.

The elastomeric material 40 which may be molded or extruded about the core or carrier 30 typically will include a first or inner flange 42 which engages an inner portion of the frame portion 12 and a second or outer flange 44 which engages an exterior portion of the frame portion 12, illustrated in FIG. 1. It should be appreciated that the configuration, especially with regard to the flanges 42 and 44 of the weatherstrip assembly 20 is illustrative of weatherstrip assemblies in general and is not intended to be limiting. In this regard, while this description refers to the assembly 20 as a weatherstrip, it should be appreciated that the invention applies equally well to and may be utilized with a beltstrip. The elastomeric material 40 is preferably, approximately 70 durometer in hardness and may be selected from a number of elastomers and thermoplastics such as EPDM, TPE, and TTE, for example. If desired, a surface treatment such as flocking may be disposed in the glass run or channel 46.

Referring now to FIG. 4, a first alternate embodiment of the core or carrier 30 is illustrated and designated by the reference number 30A. The first alternate embodiment carrier 30A includes a less flexible, i.e., more rigid, region 52 which is undisturbed (solid) material. It also includes a second more flexible, i.e., less rigid, and more compressible region 54 having slits 56 which extend transversely inwardly from its edges as well as both transversely and longitudinally intermediately disposed arcuate slots 58. If desired, the more flexible region 54 may be stretched or expanded longitudinally to increase the widths of the slits 56 and the arcuate slots 58 to further increase flexibility and compressibility. As noted above, regions such as the region 52 which lacks through openings in the carrier core 30A, typically require a metal primer and/or adhesive to suitably and appropriately secure the extruded or molded elastomeric material 40 to the carrier or core 30A in regions such as the low flexibility region 52.

Figure 5:
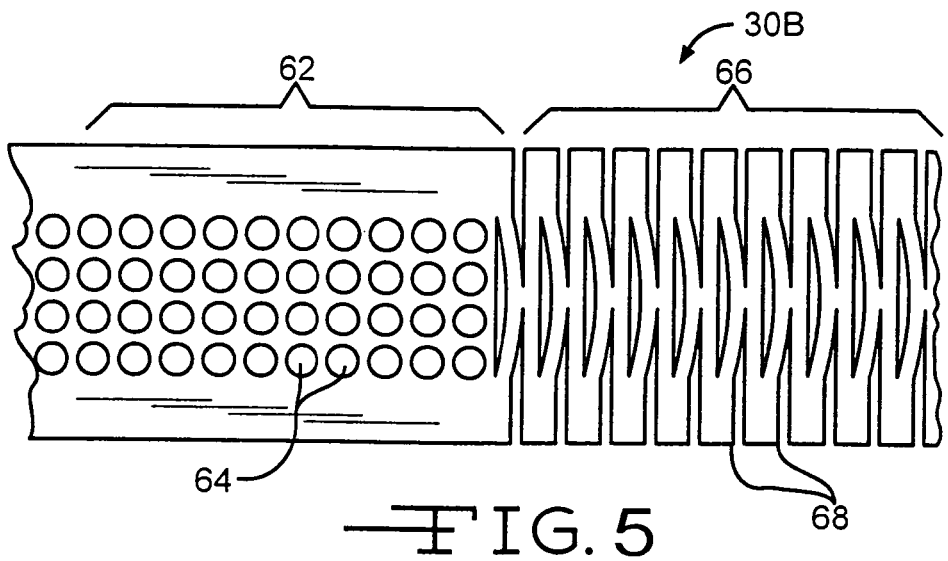
FIG. 5 is an enlarged, plan view of a second alternate embodiment carrier or core of a motor vehicle weatherstrip according to the present invention.

Referring now to FIG. 5, a second alternate embodiment core or carrier 30B is illustrated. Once again, it includes a region 62 of less flexibility, i.e., greater rigidity, and less compressibility which is defined by a plurality of through apertures 64. The through apertures 64 are preferably aligned in uniform columns and occupy the center portion of the carrier or core 30B but not the outer, edge adjacent regions. The apertures 64 thus facilitate intimate and positive bonding between the elastomeric material 40 and the core or carrier 30B while the outer, solid region of the core 30B provides appropriate rigidity to the region 62.

The core or carrier 30B also includes a region 66 of increased flexibility, i.e., reduced rigidity, and increased compressibility which once again defines a plurality of parallel, transverse slits 68 which extend inwardly from the edges of the carrier or core 30B. Disposed intermediate the slits 68 are arcuate slots 70. As noted above, the regions 66 of increased flexibility may, if desired, be expanded or stretched to further reduce its rigidity and increase its flexibility and compressibility.

Figure 6:
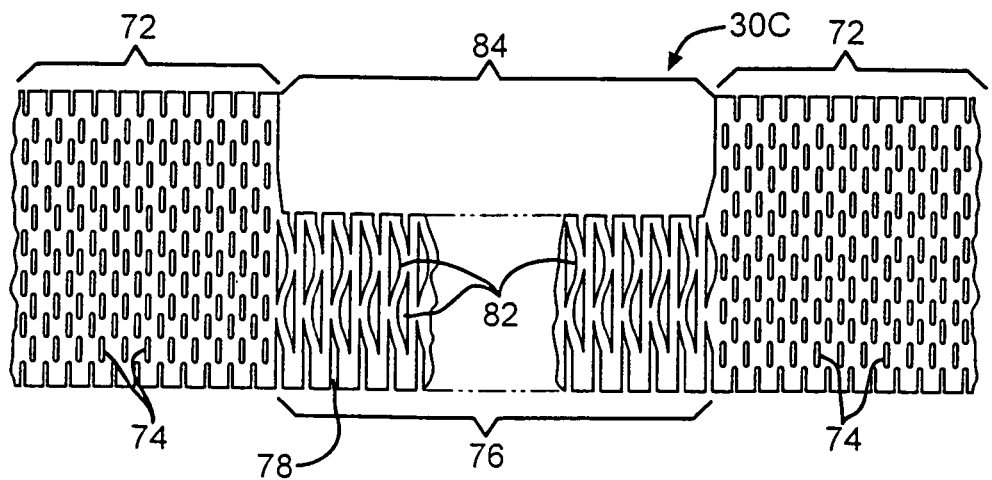
FIG. 6 is an enlarged, plan view of a third alternate embodiment carrier or core of a motor vehicle weatherstrip according to the present invention having a portion removed.

Referring now to FIG. 6, a third alternate embodiment core or carrier 30C is illustrated. Once again, it includes a region or regions 72 of lesser flexibility, i.e., greater rigidity, and less compressibility which is defined by a plurality of through slots 74. The through slots 74 are preferably aligned in a uniform array. It will thus be appreciated that the slots 74 facilitate intimate and positive bonding between the elastomeric material 40 and the core or carrier 30C.

The core or carrier 30C also includes a region 76 of enhanced flexibility, i.e., reduced rigidity, and increased compressibility which, first of all defines a plurality of parallel transverse slits 78 which extend inwardly from the edges of the core or carrier 30C. The core or carrier 30C also includes a skived region 84, that is, a region 84 where a portion, e.g., approximately one half its width, has been removed along a portion of its length. The removal of such material as illustrated by the reduced width or skived portion 84 further reduces the rigidity of the core or carrier 30C and increases its compressibility. Skiving of a portion of the core or carrier 30C may be particularly useful when the frame portion 12 of the door (illustrated in FIG. 1) which receives the weatherstrip assembly 20 includes oblique or angularly disposed regions which tilt or cant the weatherstrip assembly 20.

Referring now to FIG. 7, a sidewall portion 90 of a motor vehicle is schematically illustrated having a first door 92 and a second door 94. Preferably secured to each of the doors 92 and 94 about their peripheries is a door seal assembly 100.

As illustrated in FIG. 8, the door seal assembly 100 includes a carrier or core 30D which is essentially similar to the carriers or cores 30 and 30B described above. As such, it includes a region 102 of less flexibility, i.e., greater rigidity defined by a plurality of through apertures 104 and a region 106 of greater flexibility, i.e., lesser rigidity, and greater compressibility defined by inwardly extending slits 108 as well as intermediate slots 110 or similar features. The core or carrier 30D is encapsulated by molding or extruding with an elastomeric material 112. The elastomeric material 112 is formed into a channel 114 which mimics the shape of the core or carrier 30B which facilitates mounting and retention of the door seal assembly 100 upon complementarily configured features (not illustrated) of the vehicle doors 92 and 94 as well as a hollow, horseshoe or balloon shaped section 116 which is relatively very resilient and flexible and achieves a seal against an adjacent portion of the vehicle body when the doors 92 and 94 are closed. Once again, the relatively less flexible regions 102 of the door seal assembly 100 are utilized along straight or relatively straight regions of the doors 92 and 94 and the relatively more flexible and compressible regions 106 corresponds to curved regions of the peripheries of the doors 92 and 94.

Manufacture of the weatherstrip assembly 20 and the door seal assembly 100 will now be briefly described. Preferably, the core or carrier 30, 30A, 30B or 30C is fabricated in a continuous, uninterrupted length having regions of lesser flexibility, i.e., greater rigidity, alternating with regions of greater flexibility, i.e., less rigidity. As noted, these regions may be achieved by stamping, punching, lancing, coining, and, if desired, stretching to achieve the desired degree of flexibility or rigidity. Next and preferably, the carrier or core 30, 30B or 30C is passed into an extruding machine where in the desired elastomeric material 40 or 112 is extruded onto the core or carrier.

In the case of the core or carrier 30A which contains a less flexible region 52 having no upset of the carrier or core 30A, a metal primer and/or adhesive may be applied to ensure good adhesion of the elastomeric material 40 to the region 52. By suitably timed or synchronized cutting mechanisms, or the use of an X-ray or metal density sensor driving a cutting mechanism, the weatherstrip assemblies 20 or door seal assemblies 100 may then be appropriately cut such that each assembly 20 and 100, first of all, is of the desired and required length and, second of all, contains the appropriate number, length and location of more flexible and less flexible regions. Alternatively, the core or carrier 30, 30A, 30B and 30C may be first cut into desired lengths at which time the elastomeric material 40 or 112 is then either extruded or molded about the cores or carriers. Finally, and if desired, flocking or other surface treatment (not illustrated) may be applied to the weatherstrip assembly 20 in desired regions.

The foregoing disclosure is the best mode devised by the inventor for practicing this invention. It is apparent, however, that devices incorporating modifications and variations will be obvious to one skilled in the art of weatherstrips, beltstrips and door seals for motor vehicles. Inasmuch as the foregoing disclosure is intended to enable one skilled in the pertinent art to practice the instant invention, it should not be construed to be limited thereby but should be construed to include such aforementioned obvious variations and be limited only by the scope and spirit of the following claims.

The invention claimed is:

1. An elongate weatherstrip for a motor vehicle, said weatherstrip comprising, in combination,
    a metal carrier including a length and having a first longitudinally extending region of a first flexibility and a second longitudinally extending region adjacent said first region of a second flexibility distinct from said first flexibility, said first region being longitudinally distinct from said second region,
    said metal carrier including a base and two spaced legs extending from said base, said legs and said base each having a width extending transverse to said length with said width of said legs in said first longitudinally extending region being equal to said width of said legs in said second longitudinally extending region;
    wherein said first region includes a plurality of apertures on said base and said legs with said plurality of apertures each having a common first configuration, being spaced a first distance along said length, being spaced from each other along said width of said base, and being spaced from each other along said width of said legs to define a first repeating pattern disposed only within said first region, said apertures on said base sized so as to extend only along a portion of said width of said base,
    wherein said second region includes a plurality of transverse slits on said base and said legs, said plurality of transverse slits each having a common second configuration distinct from said common first configuration of said apertures and being spaced from each other a second distance along said length different than said first distance to define a second repeating pattern disposed only within said second region that is different than said first repeating pattern, and
    an elastomeric material disposed about said carrier and including at least one sealing feature.

2. The weatherstrip of claim 1 wherein said metal carrier is fabricated of steel or aluminum.

3. The weatherstrip of claim 1 wherein said plurality of apertures are disposed generally centrally along said metal carrier.

4. The weatherstrip of claim 1 wherein said sealing feature includes a pair of flanges.

5. The weatherstrip of claim 1 wherein said metal carrier is U-shaped in cross-section and a portion of said elastomeric material defines a corresponding U-shape.

6. The weatherstrip of claim 1 wherein said metal carrier is a continuous, unitary piece.

7. The elongated weatherstrip of claim 1 wherein said apertures are sized and shaped differently along said length than said transverse slits.

8. A sealing strip for a motor vehicle comprising, in combination,
    a carrier including a base and two spaced legs extending from said base with each of said legs and said base having a first longitudinally extending region defining a first length and a first flexibility and a second longitudinally extending region defining a second length and a second flexibility distinct from said first flexibility, the first region being longitudinally distinct from the second region,
    said legs and said base of each of said regions each having a width extending transverse to said first and second lengths,
    wherein said first region includes a plurality of apertures on said base and said legs, with said plurality of apertures having a common size and shape and being spaced from each other along said first length and said width of said base and said legs within said first region to define a first repeating pattern disposed only within said first region,
    wherein said second region includes a plurality of transverse slits on said base and said legs with said plurality of transverse slits being spaced from each other along said second length to define a second repeating pattern disposed only within said second region that is different than said first repeating pattern with a portion of said transverse slits of said second region extending along the entire width of one of said legs and into said base, and
    an elastomeric material disposed about said carrier and including at least one feature adapted to provide a seal against a vehicle component.

9. The sealing strip for a motor vehicle of claim 8 wherein said carrier is fabricated of steel or aluminum.

10. The sealing strip for a motor vehicle of claim 8 wherein said sealing feature includes a pair of flanges.

11. The sealing strip for a motor vehicle of claim 8 wherein said sealing feature includes a generally circular, hollow member.

12. The sealing strip for a motor vehicle of claim 8 wherein said carrier has a U-shape and a portion of said elastomeric material defines a shape corresponding to said U-shaped carrier.

13. The sealing strip of claim 8 wherein said apertures are sized and shaped differently along said length than said transverse slits.

14. A weatherstrip for a motor vehicle comprising, in combination,
- a hybrid carrier having a first longitudinally extending region including a first length and having a first flexibility and a second longitudinally extending region adjacent said first region and including a second length, said second region having a second flexibility distinct from said first flexibility,
- said hybrid carrier having a base and two legs extending from said base to define a U-shape and each of said base and legs having a width transverse to said first and second lengths, said width of said legs along said first longitudinally extending region being equal to said width of said legs along said second longitudinally extending region;
- a plurality of apertures disposed on said base and said legs only in said first region and being spaced along said first length and along said width of said base and said legs of said first region to define a first repeating pattern disposed only within said first region,
- a plurality of transverse slits disposed only in said second region and being spaced along said second length on said base and said legs to define a second repeating pattern disposed only within said second region that is different than said first repeating pattern, and
- an elastomeric sealing material encapsulating said carrier, said material defining at least one longitudinally extending sealing feature.

15. The weatherstrip of claim 14 wherein said hybrid carrier is fabricated of metal.

16. The weatherstrip of claim 14 wherein said plurality of apertures are disposed generally centrally along said hybrid carrier.

17. The weatherstrip of claim 14 wherein said sealing feature includes a pair of flanges.

18. The weatherstrip of claim 14 wherein said elastomeric material defines a U-shape corresponding to said U-shape of said hybrid carrier.

19. The weatherstrip of claim 14 wherein said apertures are spaced from each other a first distance along said length and said transverse slits are spaced from each other a second distance along said length different than said first distance.

* * * * *